United States Patent
Iwasaki et al.

(10) Patent No.: US 6,613,117 B2
(45) Date of Patent: Sep. 2, 2003

(54) SILICIC FERTILIZER AND PRODUCTION METHOD THEREOF

(75) Inventors: Masaki Iwasaki, Tokai (JP); Kazunori Fukiage, Tokai (JP); Hiroshi Matsumoto, Tokai (JP)

(73) Assignee: Nippon Steel Corporation, Tokyo (JP)

(*) Notice: Subject to any disclaimer, the term of this patent is extended or adjusted under 35 U.S.C. 154(b) by 19 days.

(21) Appl. No.: 09/904,778

(22) Filed: Jul. 12, 2001

(65) Prior Publication Data

US 2002/0007656 A1 Jan. 24, 2002

(30) Foreign Application Priority Data

Jan. 14, 2000 (JP) ........................... 2000-005587
Jan. 11, 2001 (JP) ........................... 2001-003468

(51) Int. Cl.$^7$ ............................. C05D 9/00; C05D 3/04
(52) U.S. Cl. ............................... 71/62; 71/31
(58) Field of Search ........................... 71/62, 31

(56) References Cited

U.S. PATENT DOCUMENTS

| | | | |
|---|---|---|---|
| 4,248,617 A | * | 2/1981 | Kamo et al. ............ 71/42 |
| 4,415,359 A | * | 11/1983 | Nishimura et al. ........ 75/60 |
| 4,522,650 A | * | 6/1985 | Nakajima et al. ......... 75/48 |

FOREIGN PATENT DOCUMENTS

| | | | |
|---|---|---|---|
| DD | 265616 | | 3/1989 |
| FR | 2374277 | | 8/1978 |
| JP | 54004760 | * | 6/1977 |
| JP | 53017162 | | 2/1978 |
| JP | 4004760 | | 1/1979 |
| JP | 6078486 | | 6/1981 |
| JP | 57179090 | * | 11/1982 |
| JP | 04243992 | * | 9/1992 |
| JP | 11116364 | * | 4/1999 |
| JP | 2000-226284 | | 8/2000 |
| JP | 2000-226285 | | 8/2000 |
| SU | 1488290 | | 6/1989 |
| SU | 1792933 | | 2/1993 |

* cited by examiner

Primary Examiner—Chhaya D. Sayala
(74) Attorney, Agent, or Firm—Kenyon & Kenyon

(57) ABSTRACT

This invention provides a silicic fertilizer using a slag produced in a preliminary treatment of a molten pig iron and imparted with a high soluble silica content, and a production method of such a silicic fertilizer. CaO is added and oxygen is blown into a molten pig iron while adjusting a basicity ($CaO/SiO_2$) to 3 or below, and the molten pig iron is subjected to desiliconization and dephosphorization. The resulting slag is collected to produce the silicic fertilizer. This silicic fertilizer has a basicity ($CaO/SiO_2$) of not greater than 3 and contains 15 to 35 mass % of soluble silica.

2 Claims, No Drawings

SILICIC FERTILIZER AND PRODUCTION METHOD THEREOF

BACKGROUND OF THE INVENTION

1. Field of the Invention

This invention relates to a silicic fertilizer produced by mainly making the most of a converter slag generated by a molten pig iron preliminary treatment, and a production method of such a silicic fertilizer.

The term "preliminary treatment" or "preliminary process" according to the present invention generally includes desulfurization, desiliconization and dephosphorization treatment of a molten pig iron, and further includes preparatory treatment to adjust the silicon and/or sulfur content contained in a molten pig iron if such contents are high, and further includes a main process of desiliconization and dephosphorization by adding CaO and blowing oxygen into a molten pig iron.

The term "preparatory treatment" according to the present invention includes desulfurization and desiliconization treatment to adjust silicon and sulfur content of a molten pig iron if such contents are high.

The term "main process" according to the present invention includes a desiliconization and dephosphorization process by adding CaO and blowing oxygen into a molten pig iron.

2. Description of the Related Art

Granulated slag, produced by discharging slag from a blast furnace and separating and water-cooling the slag generated in a steel-making process and converter slag generated by a molten pig iron preliminary treatment in a converter, have been effectively utilized in the past to produce fertilizers for grasses such as rice plants, corn and wheat, besides an application as concrete aggregates.

However, the fertilizer utilizing the blast furnace slag is prepared by merely pulverizing the slag to a particle size of not greater than 3 mm, or by adding citric acid-soluble phosphorus oxide ($P_2O_5$) (citric acid solubility), which is not sufficient, to the slag. Therefore, the ratio of soluble silica in silica ($SiO_2$) as a constituent material of the slag is small, and the silica does not easily elute into the soil. Incidentally, the term "soluble silica" means the leached silica when a material containing silica is shaken in a 0.5N hydrochloric acid solution at 30° C. for 1 hour, and the term "soluble lime" means the lime (CaO) leached out when a similar test is conducted.

The terms "citric acid-soluble phosphorus oxide", "citric acid-soluble magnesia" and "citric acid-soluble manganese oxide" all mean phosphorus oxide, magnesia and manganese oxide in materials that elute (dissolve) in 2% citric acid, respectively.

On the other hand, the conventional converter slag is treated at a high temperature of around 1,600° C. after lime, an iron ore and a Mn ore as sub-materials are collectively added besides the supply of oxygen. Because the lime content added is large, the resulting slag is not a slag having low basicity of 3 or below, and the silica content is small, too. Further, the soluble silica content is small in the same way as the blast furnace slag. Since desulfurization is carried out by use of soda ash, the soda content and the sulfur content are large, and the resulting slag is not suitable as a fertilizer for the grasses.

Soluble silica is an important component for the growth of the grasses. If this content is small, the grasses are likely to be blown down by a strong wind, and are not resistant to damage by blight and noxious insects and damage by cold weather. The growth and ripening are thus deteriorated when the soluble silica is not sufficient.

Needless to say, fertilizers having greater contents of effective ingredients are preferred not only for the grasses but also for general plants to those having smaller contents. As the ages of the people engaged in the agricultural production have become higher and higher on the average in recent years, development of a fertilizer that provides the effect equivalent to, or higher than, the conventional fertilizers even with a smaller spray amount, and can improve the efficiency and mitigate the labor has therefore been required.

SUMMARY OF THE INVENTION

Against the background described above, the present invention provides a silicic fertilizer that makes the most of a slag produced in a molten pig iron preliminary process and has a large soluble silica content, and a production method for the silicic fertilizer.

The gist of the present invention for solving the problems described above is listed below.

(1) A silicic fertilizer comprising a slag having basicity ($CaO/SiO_2$) of not greater than 3 and containing 15 to 35 mass % (hereinafter expressed merely by "%") of soluble silica;

(2) A silicic fertilizer comprising a slag containing 15 to 35% of soluble silica, 30 to 45% of soluble lime, not greater than 8% of citric acid-soluble magnesia, 1 to 8% of citric acid-soluble manganese oxide and less than 5% of citric acid-soluble phosphorus oxide;

(3) In the slag of (1) or (2), a silicic fertilizer containing 15 to 35% of soluble silica, 30 to 45% of soluble lime, not greater than 8% of citric acid-soluble magnesia, 1 to 8% of citric acid-soluble manganese oxide and at least 5% of citric acid-soluble phosphorus oxide;

(4) A silicic fertilizer comprising a slag having basicity ($CaO/SiO_2$) of not greater than 3 and containing 15 to 35% of soluble silica, 30 to 45% of soluble lime, not greater than 8% of soluble magnesia, 1 to 8% of citric acid-soluble manganese oxide and less than 5% of citric acid-soluble phosphorus oxide;

(5) A silicic fertilizer of (1) or (2) or (4), wherein citric acid-soluble phosphorus oxide is further added to the slag, and the slag contains at least 5% of citric acid-soluble phosphorus oxide.

(6) A silicic fertilizer comprising a slag having basicity ($CaO/SiO_2$) of not greater than 3 and containing 15 to 35% of soluble silica, 30 to 45% of soluble lime, not greater than 8% of citric acid-soluble magnesia, 1 to 8% of citric acid-soluble manganese oxide and at least 5% of citric acid-soluble phosphorus oxide;

(7) A method of producing a silicic fertilizer comprising the steps of adding CaO to a molten pig iron, blowing oxygen into the molten pig iron, desiliconizing and dephosphorizing the molten pig iron, and collecting a slag having basicity ($CaO/SiO_2$) of not greater than 3 and containing 15 to 35% of soluble silica.

(8) A method of producing a silicic fertilizer comprising the step of conducting either one, or both, of a preparatory treatment step of adding a desulfurizer to a molten pig iron and conducting a desulfurization treatment and a preparatory process step of desiliconization treatment of blowing oxygen into a molten pig iron and adjusting a silicon content; a step of removing the resulting slag formed through the preparatory treatment steps, further adding CaO and blowing oxygen into the molten pig iron to desiliconize and dephosphorize the molten pig iron, and collecting a slag containing 15 to 35% of soluble silica.

DESCRIPTION OF THE PREFERRED EMBODIMENTS

The silicic fertilizer according to the present invention makes the most of a slag having a soluble silica content of as high as 15 to 35%. The slag having such a high soluble silica content is presumably formed by the mechanism in which lime and oxygen are added to a molten pig iron originally having low sulfur and silicon contents, or to a molten pig iron the sulfur and silicon contents of which are in advance lowered by desulfurization and desiliconization preparatory treatment, and desiliconization and dephosphorization are then carried out with the result that lime enters the network of silica constituting the slag and weakens the mutual silica bonds. One of the main process steps for obtaining the silicic fertilizer according to the present invention is a step of blowing CaO powder with oxygen to the molten pig iron through a lance, or adding CaO in the lump form to the molten pig iron and blowing oxygen through the lance, and carrying out desiliconization and dephosphorization after the basicity of the slag is thus set to 3 or below, preferably between 1.5 to 2.5. The present invention can thus provide a silicic fertilizer having a high soluble silica content. Incidentally, the molten pig iron preliminary processing temperature in ordinary converters must be as high as around 1,600° C. because various sub-materials must be added in large quantities as described above. However, since the amounts of the additives are small in the present invention, the present invention can conduct the processing between 1,250 and 1,400° C., preferably between 1,300 and 1,350° C., and can produce a silicic fertilizer having a desired basicity and a desired soluble silica content.

Incidentally, unless the basicity ($CaO/SiO_2$) of the slag is 3 or below, the lime content in the slag becomes so great that the soluble silica content cannot be raised to 15% or more. When the basicity is 2.5 or below, the slag has a soluble silica content of 20% or more. Because $Ca^{2+}$ and $OH^-$ increase with the rise of the basicity of the slag in an acidic aqueous solution or a neutral aqueous solution as expressed by the following formulas (1) and (2), it becomes difficult for the silica ions ($SiO_4^{4-}$) to exist. When the basicity of the slag is less than 1.5, on the other hand, it is estimated that the network of silica becomes stronger, and the soluble silica content in the slag drops. For these reasons, the basicity of the slag is preferably 1.5 to 2.5.

$$mCaO \cdot SiO_2 + (m-n-2)H_2O + nH^+ \rightarrow mCa^{2+} + SiO_4^{4-} + (2m-n-4)OH^- \quad (1)$$

$$K = \frac{[Ca^{2+}]^m \times [SiO_4^{4-}] \times [OH^-]^{(2m-n-4)}}{[H^+]^n} \quad (2)$$

K: equilibrium constant

The silicic fertilizer must have stable quality. Before the main processing of adding lime and oxygen to the molten pig iron and conducting desiliconization and dephosphorization in the production method of the present invention, a sample of a straight molten pig iron is collected at the converter and the chemical composition of the molten pig iron is analyzed. The main processing is carried out only when the sulfur content and the silicon content of the molten pig iron are 0.03% or below and 0.8% or below, respectively.

When the sulfur and silicon contents of the molten pig iron are high, however, the afore-mentioned preparatory process steps must be carried out. In other words, when the sulfur content in the molten pig iron is higher than 0.03%, the slag becomes a slag having a high sulfur content and is not suitable for a fertilizer. To prevent deterioration of fertilizer quality, desulfurization must be conducted. Generally, a desulfurizer such as CaO or carbide is blown through a lance for desulfurization while the molten pig iron still exists inside a torpedo car. At this time, iron oxide, aluminum ash, or the like, may be used as an oxidizer. The resulting slag is separated and removed from the molten pig iron. When the silicon content in the molten pig iron is higher than 0.8%, the preparatory desiliconization treatment must be conducted to adjust the basicity of the slag. To conduct this preparatory desiliconization treatment, it is customary to transfer the desulfurized molten pig iron into the converter and to blow oxygen through the lance. In this way, the molten pig iron comes to have the sulfur content of 0.03% or below and the silicon content of 0.8% or below. The slag formed by the preparatory treatment is removed in order to prevent deterioration of quality of the fertilizer raw material. After the preparatory treatment, CaO and oxygen are added to the molten pig iron, and desiliconization and dephosphorization treatment are carried out while the basicity is adjusted, as described above. The intended silicic fertilizer can thus be obtained.

As described above, the silicic fertilizer comprising of the slag of the present invention can be produced by the steps of adding lime (CaO) and oxygen to the molten pig iron, or to the molten pig iron subjected to the preparatory treatment for desiliconization or desulfurization, whenever necessary, in the converter, adjusting the basicity of the slag to 3.0 or below, and conducting desiliconization treatment and dephosphorization treatment, producing thereby the slag containing 15 to 35% of soluble silica ($SiO_2$) as the silicic fertilizer of (1) given above.

The content of other component of the resulting slag such as soluble lime, citric acid-soluble magnesia, citric acid-soluble manganese oxide, citric acid-soluble phosphorus oxide, etc., is analyzed and confirmed. When the slag contains 30 to 45% of soluble lime, not greater than 8% of citric acid-soluble magnesia, 1 to 8% of citric acid-soluble manganese oxide and less than 5% of citiric acid-soluble phosphorus oxide, it is collected as the silicic fertilizer of (2) and (4) given above.

In the case of the silicic fertilizer requiring a large amount of citric acid-soluble phosphorus oxide, citric acid-soluble phosphorus oxide such as a citric acid-soluble phosphoric fertilizer containing 20% of citric acid-soluble phosphorus oxide or a heavy baked phosphoric fertilizer containing 35% of citric acid-soluble phosphorus oxide, for example, is added to the slag of (1) having the citric acid-soluble phosphorus oxide content of less than 5% or to the slag of (2) and (4) having the citric acid-soluble phosphorus oxide content of less than 5%, thereby giving the silicic fertilizer of (3) or (5).

Also, the silicic fertilizer of (5) can be obtained when the slag containing 30 to 45% of soluble lime, not greater than 8% of citric acid-soluble magnesia, 1 to 8% of citric acid-soluble manganese oxide and at least 5% of citric acid-soluble phosphorus oxide is collected from among the slag of (1).

In other words, the phosphorus content in an ordinary molten pig iron is about 0.1 to about 0.2%. However, because the amount of the slag formed by the preliminary treatment is large, the phosphorus content in the slag is less than 5% and is generally 1 to 4%. When a molten pig iron having a high phosphorus content by use of an ore having a high phosphor content is subjected to the desiliconization and dephosphorization treatment, the phosphorus oxide content in the slag becomes great, and a slag having a citric acid-soluble phosphorus oxide content of 5% or more can be collected.

The contents of the above-mentioned components in the slag generated by the molten pig iron preliminary treatment are affected by the contents of Si, Mn, P, S, etc., in the molten pig iron, by lime (CaO) added during the preliminary treatment, by the amounts of other sub-materials and by the refractory composition of the treating vessels such as the converter.

Therefore, citric acid-soluble magnesia, for example, can be adjusted and controlled by the addition amount of dolomite as the sub-material, the citric acid-soluble manganese oxide, by the Mn content in the molten pig iron and the addition amount of the manganese ore as the sub-material, and the citric acid-soluble phosphorus oxide, by the P content in the molten pig iron and the basicity.

According to the method of the present invention that adds CaO and oxygen to the molten pig iron and desiliconizes and dephosphorizes the molten pig iron while adjusting the basicity of 3.0 or below, preferably 2.5 or below, the resulting slag can contain 15 to 35% of citric acid-soluble silica as described above.

As to soluble lime, citric acid-soluble magnesia, citric acid-soluble manganese oxide and citric acid-soluble phosphorus oxide, the slag is of course collected after the contents of the components in the slag are analyzed and confirmed for each treatment charge.

Incidentally, as to citric acid-soluble manganese oxide (MnO) and citric acid-soluble phosphorus oxide ($P_2O_5$), when the Mn and P contents in the molten pig iron are found in advance, the slag that is to be collected or the kind of the silicic fertilizer that can be produced can be efficiently estimated in advance. The term "collection" used herein means the operation that analyzes the resulting slag of the molten pig iron preliminary treatment, and separates and collects the slag having a composition in conformity with the composition of the raw materials of the silicic fertilizer according to the present invention.

The silicic fertilizer according to the present invention is generally in the form of granules obtained by pulverizing and granulating the slag described above.

Next, the reasons for limitation of each component in the silicic fertilizer according to the present invention will be explained.

The soluble silica content in the silicic fertilizer according to the present invention is limited to 15 to 35%, because soluble silica in the fertilizer for the grasses is not sufficient when this content is less than 15%. Preferably, the soluble silica content is at least 20%. When this content exceeds 35%, the effect gets into saturation and moreover, the addition amount of CaO for dephosphorization becomes small with the result that dephosphorization becomes insufficient. The soluble lime content is limited to 30 to 45% because soluble lime is an effective component for neutralizing the soil and for promoting the growth of the grasses, and at least 30% of soluble lime is necessary. However, when this content exceeds 45%, the content of soluble silica becomes low, on the contrary. The citric-acid soluble magnesia (MgO) is limited to 8% or below. Magnesia is used for correcting the acidity of the soil in combination with lime and is an important component as the nutrient sources for plants. Magnesia is contained in the chlorophyll in the plants, and is effective for improving the taste of rice among the grasses, in particular. When the citric acid soluble magnesia content exceeds 8%, the effect gets into saturation. The content of citric acid-soluble manganese oxide (MnO) is limited to 1 to 8%. MnO, too, is an effective component for the growth of plants. When this content is less than 1%, it is not suitable for the fertilizer but when it exceeds 8%, the effect gets into saturation.

The content of citric acid-soluble phosphorus oxide varies depending on the application. The molten pig iron contains 0.1 to 0.2% of the phosphorus content, but the amount of the slag formed by desiliconization and dephosphorization is so great that the content of phosphorus oxide contained in the slag as the silicic fertilizer is less than 5%, and is generally from about 1 to about 4%. Therefore, the citric acid-soluble phosphorus oxide content is limited to less than 5% in the silicic fertilizer for an application that does not particularly require the citric acid-soluble phosphorus oxide content.

In the silicic fertilizer for the application requiring the citric acid-soluble phosphorus oxide content, however, the citric acid-soluble phosphorus oxide content must be at least 5%. When this content is less than 5%, the effect of phosphorus oxide cannot be fully exhibited, and when it exceeds 25%, on the other hand, the effect gets into saturation. Therefore, the upper limit is preferably 25%.

EXAMPLE 1

Hereinafter, the present invention will be explained more concretely with reference to Examples thereof.

CaO powder was directly blown with oxygen through a lance into a molten pig iron containing S: 0.024% and Si: 0.65% in a converter without conducting preparatory treatment of desulfurization and desiliconization so as to desiliconize and dephosphorize the molten pig iron. A slag having a basicity of 2.1 was collected, and was then pulverized and granulated to give a silicic fertilizer A tabulated in Table 1.

Similarly, the addition amount of CaO powder to be blown and added into the molten pig iron was varied, and desiliconization and dephosphorization were carried out. Slag having a basicity of 2.6, 1.6 and 1.8 was collected to give silicic fertilizers B, C and G having component compositions tabulated in Table 1.

EXAMPLE 2

CaO and aluminum ash were added to a molten pig iron having S: 0.036% and Si: 0.88% and stored in a torpedo car. A preparatory desulfurization treatment was carried out and the resulting slag was removed. Next, oxygen was blown into the molten pig iron that was desulfurized and charged into a converter, and a preparatory desiliconization treatment was carried out. The resulting slag was then removed. CaO was blown with oxygen through a lance into the resulting molten pig iron that contained S: 0.007% and Si: 0.15%. A slag having a basicity of 2.0 was collected and was then pulverized. After citric acid-soluble phosphorus oxide was added, the slag was granulated to give a silicic fertilizer D having a component composition tabulated in Table 1.

Similarly, the addition amount of CaO powder to be blown and added into the molten pig iron preparatory treated was varied, and desiliconization and dephosphorization were carried out. Slag having a basicity of 1.6 and 2.7 was collected and pulverized. After citric acid-soluble phosphorus oxide was added, the slag pulverized was granulated to give silicic fertilizers E and F having component compositions tabulated in Table 1.

Incidentally, of the component compositions I and J tabulated in Table 1, the fertilizer I was a fertilizer consisting of conventional granulated slag of a blast furnace and the fertilizer J was a fertilizer consisting of a conventional converter slag.

EXAMPLE 3

An operation was carried out by use of an ore having a high phosphorus content for an iron ore to be used in a blast furnace. CaO and aluminum ash were added to a molten pig iron containing P: 0.140%, S: 0.036% and Si: 0.40% and stored in a torpedo car, and a preparatory desulfurization treatment was carried out. The resulting slag was removed.

Next, a preparatory desiliconization treatment was carried out by blowing oxygen into the molten pig iron that was desulfurized and charged into the converter, and the resulting slag was removed. CaO powder was blown with oxygen through a lance into the molten pig iron containing P: 0.140%, S: 0.007% and Si: 0.15% after the preparatory treatment, and the molten pig iron was desiliconized and dephosphorized. A slag having a basicity of 2.9 was collected and pulverized. In this way, a slag containing 6.0% of citric acid-soluble phosphorus oxide could be obtained. The slag was granulated to give a silicic fertilizer H tabulated in Table 1.

TABLE 1

| Symbol | $SiO_2$ % | Soluble $SiO_2$, % | Soluble CaO, % | Citric acid-soluble $P_2O_5$, % | Citric acid-soluble $Fe_2O_3$, % | Citric acid-soluble MgO, % | Citric acid-soluble MnO, % | Section |
|---|---|---|---|---|---|---|---|---|
| A | 22 | 21 | 43 | 2.5 | 13 | 1.6 | 7.8 | Example |
| B | 17 | 16 | 44 | 4.5 | 15 | 7.5 | 2.1 | Example |
| C | 30 | 28 | 45 | 1.2 | 12 | 3.3 | 4.5 | Example |
| D | 23 | 23 | 44 | 5.5 | 12 | 1.7 | 7.7 | Example |
| E | 21 | 20 | 31 | 11.0 | 10 | 3.5 | 5.3 | Example |
| F | 15 | 15 | 37 | 14.5 | 11 | 7.6 | 1.2 | Example |
| G | 16 | 15 | 29 | 2.0 | 12 | 3.5 | 0.8 | Example |
| H | 16 | 16 | 46 | 6.0 | 12 | 3.1 | 4.0 | Example |
| I | 12 | 6 | 40 | 1.0 | 25 | 3 | 3 | Prior Art |
| J | 24 | 11 | 43 | 1.5 | 12 | 5 | 2 | Prior Art |

(%: mass %)

TABLE 2

| Symbol | Spray amount kg/10a | Unpolished rice weight kg | Dust rice weight kg | Rice yield % |
|---|---|---|---|---|
| A | 120 | 604 | 7.0 | 91.5 |
| B | 120 | 597 | 6.8 | 90.5 |
| C | 120 | 610 | 7.5 | 90.3 |
| D | 120 | 602 | 7.1 | 92.0 |
| E | 120 | 592 | 6.8 | 91.1 |
| F | 120 | 598 | 7.5 | 90.2 |
| G | 120 | 600 | 7.5 | 91.0 |
| H | 120 | 597 | 7.5 | 90.5 |
| I | 200 | 597 | 7.9 | 88.0 |
| J | 120 | 552 | 19.3 | 83.7 |

(%: mass %)

Each of the fertilizers tabulated in Table 1 was sprayed to each adjacent paddy field of 10 ares having similar meteorological condition and soil condition to grow rice. The result was tabulated in Table 2.

The conventional fertilizer I was sprayed in an amount of 200 kg/10 ares and gave a result of 597 kg of unpolished rice and 7.9 kg of dust rice with a ripe yield ratio of 88.0%.

The conventional fertilizer J was sprayed in an amount of 120 kg/10 ares and gave a low yield of 552 kg of unpolished rice. The dust rice weight was as great as 19.3 kg and the ripe yield ratio was only 83.7%.

In contrast, the fertilizers A to H of Examples of the present invention could provide excellent results of an unpolished rice weight of 592 to 610 kg, a dust rice weight of 6.8 to 7.5 kg with a ripe yield ratio of 90% or more in all cases at the spray amount of 120 kg/10 ares, that is, 60% of the spray amount of the conventional fertilizers. These excellent results were mainly brought forth because the soluble silica content was high in the fertilizers.

As described above, the present invention can economically provide a fertilizer that mainly makes the most of the converter slag generated by the preliminary treatment of the molten pig iron, is particularly effective for the growth of the grasses and has a high soluble silica content and a high citric acid-soluble phosphorus oxide content. When citric acid-soluble phosphorus oxide is added to this fertilizer and the fertilizer is used as a silicic fertilizer, it becomes possible to obtain a yield that is by far higher than the conventional fertilizers. Moreover, an excellent effect can be obtained with a smaller spray amount, and the fertilizer can therefore improve efficiency of the agricultural work and can mitigate the burden on workers.

What is claimed is:

1. A method of producing a silicic fertilizer comprising the steps of:
    adding CaO to a molten pig iron containing, in mass %, 0.03% or less of S and 0.8% or less of Si;
    blowing oxygen into the molten pig iron and desiliconizing and dephosphorizing the molten pig iron; and collecting a slag having a basicity ($CaO/SiO_2$) of not greater than 3 and containing 15 to 35% of soluble silica.

2. A method of producing a silicic fertilizer comprising the steps of:
    conducting either one, or both, of a preparatory treatment step of adding a desulfurizer to a molten pig iron and desulfurizing the molten pig iron and adjusting a sulfur content to 0.03% by mass or less, and a preparatory treatment step of desiliconization treatment by blowing oxygen into the molten pig iron and adjusting a silicon content to 0.8% by mass of less;
    removing the resulting slag formed by the preparatory treatment step,
    adding CaO and blowing oxygen into the molten pig iron to desiliconize and dephosphorize the molten pig iron; and
    collecting a slag having a basicity ($CaO/SiO_2$) of not greater than 3 and containing 15 to 35% of soluble silica.

* * * * *